US006983453B2

(12) United States Patent
Strait et al.

(10) Patent No.: US 6,983,453 B2
(45) Date of Patent: Jan. 3, 2006

(54) METHOD AND SYSTEM FOR OBTAINING PERFORMANCE DATA FROM SOFTWARE COMPILED WITH OR WITHOUT TRACE HOOKS

(75) Inventors: Gerald B. Strait, Salt Point, NY (US); Barry M. Goldberg, Ossining, NY (US); Daniel S. Gritter, Poughkeepsie, NY (US); Colette A. Manoni, Brewster, NY (US)

(73) Assignee: International Business Machines Corporation, Armonk, NY (US)

( * ) Notice: Subject to any disclaimer, the term of this patent is extended or adjusted under 35 U.S.C. 154(b) by 639 days.

(21) Appl. No.: 09/943,213

(22) Filed: Aug. 30, 2001

(65) Prior Publication Data

US 2003/0046667 A1 Mar. 6, 2003

(51) Int. Cl.
*G06F 9/44* (2006.01)
(52) U.S. Cl. .................. 717/128; 717/130; 717/131
(58) Field of Classification Search ............... 717/128, 717/124–133; 714/35, 38
See application file for complete search history.

(56) References Cited

U.S. PATENT DOCUMENTS 5,121,501 A  6/1992  Baumgartner et al. ...... 395/800

5,355,487 A * 10/1994 Keller et al. ................. 717/127

(Continued)

FOREIGN PATENT DOCUMENTS

| JP | 5204710 | 8/1993 |
| JP | 9034754 A | 2/1997 |
| JP | 10269105 A | 9/1998 |

OTHER PUBLICATIONS

IBM Technical Disclosure Bulletin, vol. 36 No. 7, Jul. 1993, pp. 39-42.

(Continued)

*Primary Examiner*—Kakali Chaki
*Assistant Examiner*—William H. Wood
(74) *Attorney, Agent, or Firm*—Lily Neff; Cantor Colburn LLP

(57) ABSTRACT

A system and method for obtaining performance data from software compiled with or without trace hooks is provided. A software application is entered and a trace data flag is set to off. For each module initiated by the software application, the trace data flag is set to on if the module is registered with a performance analyzer tool. If the module does have trace data hooks and the trace data flag is on, then, a request is transmitted to the performance analyzer tool to record trace data. If the module does not have trace data hooks and the trace flag is on, a request is transmitted to the performance analyzer tool to record trace data in response to entering and exiting the module. When the software application exits, a report based on the trace data is received from the performance analyzer tool.

13 Claims, 3 Drawing Sheets

U.S. PATENT DOCUMENTS

| | | | |
|---|---|---|---|
| 5,539,907 A | 7/1996 | Srivastava et al. | 395/700 |
| 5,675,730 A | 10/1997 | Perdue et al. | 395/183.14 |
| 5,732,273 A | 3/1998 | Srivastava et al. | 395/704 |
| 5,872,976 A | 2/1999 | Yee et al. | 395/704 |
| 5,960,198 A * | 9/1999 | Roediger et al. | 717/130 |
| 6,026,236 A | 2/2000 | Fortin et al. | 395/704 |
| 6,108,700 A | 8/2000 | Maccabee et al. | 709/224 |
| 6,282,701 B1 * | 8/2001 | Wygodny et al. | 717/125 |
| 6,598,180 B1 * | 7/2003 | Dryfoos et al. | 714/38 |
| 6,678,883 B1 * | 1/2004 | Berry et al. | 717/128 |
| 6,728,949 B1 * | 4/2004 | Bryant et al. | 717/127 |

OTHER PUBLICATIONS

IBM Technical Disclosure Bulletin, vol. 36 No. 7, Jul. 1993, pp. 547-558.

IBM Technical Disclosure Bulletin, vol. 40 No. 6, Jun. 1997, pp. 47-50.

* cited by examiner

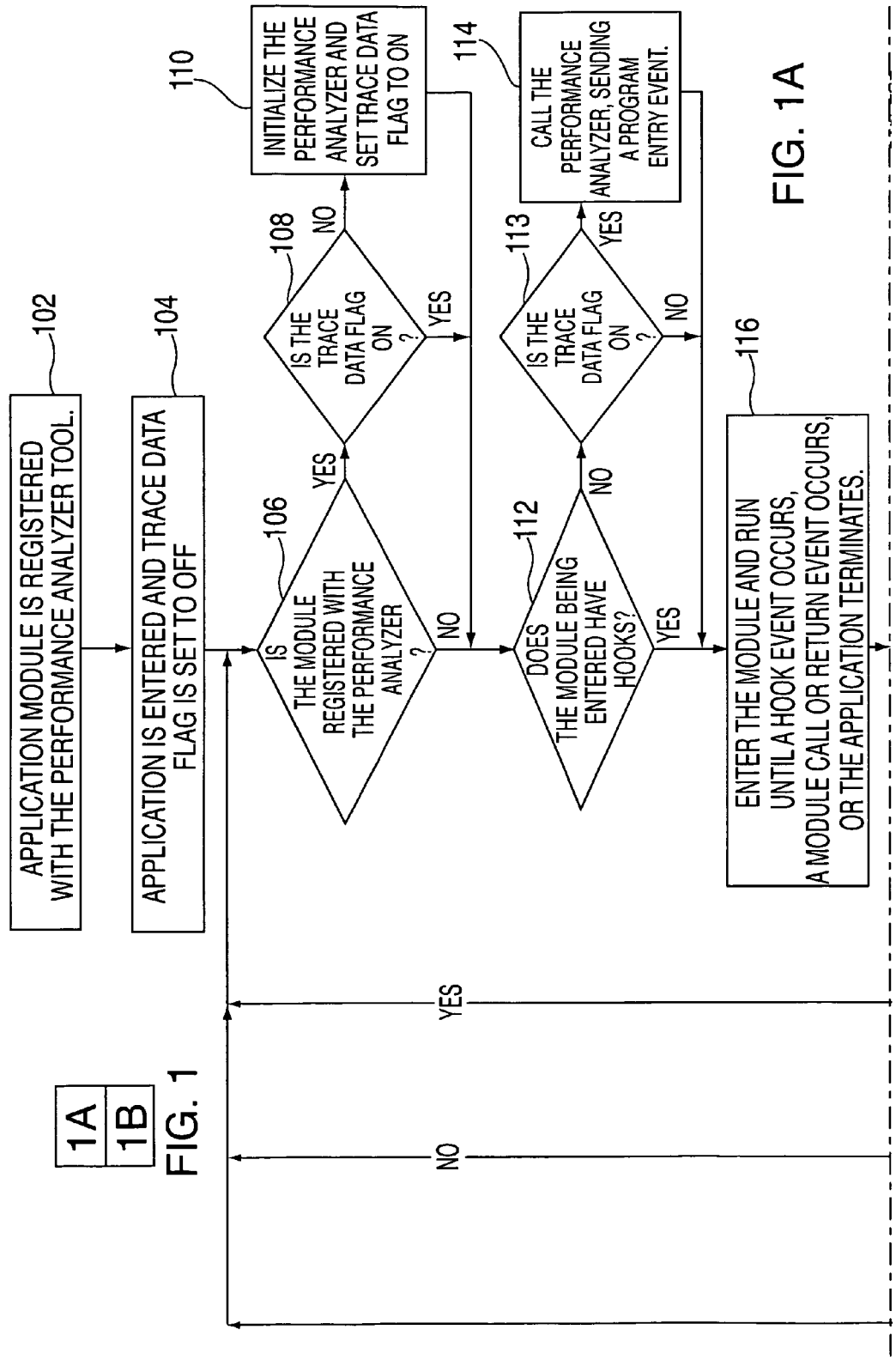

METHOD AND SYSTEM FOR OBTAINING PERFORMANCE DATA FROM SOFTWARE COMPILED WITH OR WITHOUT TRACE HOOKS

FIELD OF THE INVENTION

The present invention relates generally to software performance analysis. More particularly, the present invention relates to a method of obtaining performance data from software compiled with or without trace hooks.

BACKGROUND OF THE INVENTION

Computer software is created by writing source code files in programming languages. Source files typically consist of functions or routines that perform some operation. These source code files consist of human-readable text which are translated by compilers into a machine-readable form known as object code. The object code from one or more source code files are put together by a linker to form a load module. These modules are loaded into a computer system where they can be executed. Each object contains instructions which the computer system executes. Each instruction requires time to execute.

Software performance analysis tools are typically used by software developers to gain an understanding of time of execution and path of execution of software. The performance analysis tool is run against specific software and performance data is produced. The performance data is then presented to a developer, commonly in a graphical format. The developer, using the data, can locate places in the software where inordinate amounts of execution time are being used. The developer can then modify the source code to improve the efficiency of the software. These software performance analysis tools are also helpful in gaining an understanding of the path of execution of software. This can be especially useful if the developer does not have prior familiarity with the software.

SUMMARY OF THE INVENTION

An exemplary embodiment of the present invention is a method for obtaining performance data from software compiled with or without trace hooks. The method begins with a software application being entered and a trace data flag being set to off. Then, for each module initiated by the software application several steps are performed. First, the trace data flag is set to on if the module is registered with a performance analyzer tool. Next, it is determined whether the module being initiated contains trace data hooks. If the module does have trace data hooks and the trace data flag is on, then a request is transmitted to the performance analyzer tool to record trace data in response to encountering the embedded trace data hooks in the module. If the module does not have trace data hooks and the trace flag is on a request is transmitted to the performance analyzer tool to record trace data in response to entering and exiting the module. When the software application has exited, a report based on the trace data is received from the performance analyzer tool. Additional embodiments include a system and storage medium for obtaining performance data from software compiled with or without trace hooks.

BRIEF DESCRIPTION OF THE DRAWINGS

FIG. 1A and FIG. 1B are a flowchart of an exemplary method for obtaining performance data from software compiled with or without trace hooks.

DETAILED DESCRIPTION OF THE INVENTION

The present invention allows for software developers to record performance data for modules, mutually exclusively, via one of two methods. In an exemplary embodiment, the recording of performance data is initiated by either intelligence in the operating system services or by trace information hooks compiled into the software to be analyzed. Using the first method, recording performance data using intelligence in the operating system, results in the creation of coarse grained performance data representing execution to a load module level. An application consists of load modules which can be a single object or a collection of objects. In an exemplary embodiment, as software modules and objects are being analyzed, this coarse grained method is used to record trace data unless the object is compiled with hooks, in which case the second method is used to create fine grained performance data. In an exemplary embodiment, the operating system running the application has been modified to check for the presence of hooks in modules upon module entry and exit. The second method, the use of trace information hooks, creates finer grained performance data representing execution to a function level. One kind of hook is a program entry or exit hook and it results in trace data being generated every time a module is entered or exited. Basic information logged by the performance analysis tool could include the time and module name. Another type of hook is a function entry or exit hook which results in data being logged when the particular function is entered or exited. Typically data logged by the performance analysis tool would include the function name, the module name and the time.

The present invention can be used with any compiler that supports inserting compatible hooks into compiled source code. Examples of such compilers are the IBM OS/390 C and C++ compilers. In an exemplary embodiment the present invention is used with application modules written in C, C++, or assembler. In an exemplary embodiment, the present invention invokes a commercially available performance analyzer tool that is called to log particular performance analysis events. This performance analyzer tool can record performance data in a log. In addition, when requested or when an application completes, the performance analyzer can consolidate the log data and create a formatted report containing the data. An example of a performance analysis tool is the TPF Performance Analyzer for Visual Age Client, available from IBM.

Figure 1B:
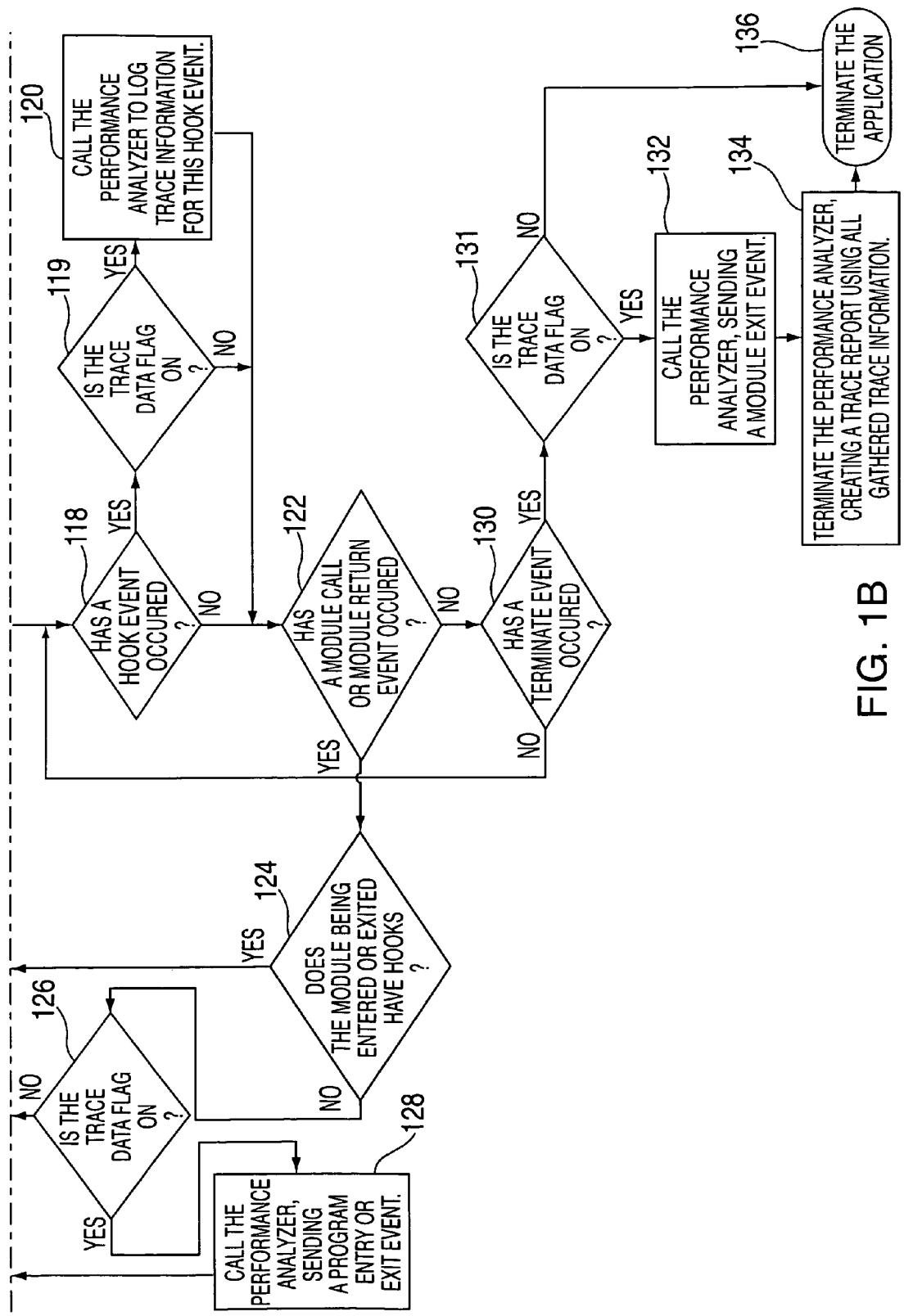

FIG. 1 depicts an exemplary method for obtaining performance data from software compiled with or without trace hooks. First, in step 102, the user registers with the performance analyzer tool which module they would like to have start the performance analysis tool. The process of registering with the performance analyzer tool enables tracing capabilities in the operating system services. When the application executes and the module registered is entered, the performance analyzer tool begins tracing. Tracing of the registered module and any modules following the registered module continues until the application terminates. Referring to FIG. 1, at step 104 the application is entered. At step 106 a check is made to see if the module about to be executed is registered with the performance analyzer tool. If the module is registered then step 108 is performed to see if the performance analyzer is already running. If the performance analyzer is not already running, it is initialized at step 110.

At step 112, a check is made to see if the module about to be entered contains hooks. The existence of hooks is determined by the operating system service which is called when a new module is being entered. If the module does not have hooks, step 113 is performed to see if the performance analyzer tool is running, which means that the current module or a previous module has been registered and that this module should collect program entry trace data. If the performance analyzer tool is running then step 114 is performed and the performance analyzer tool is called to log a program entry event. The module is entered at step 116 and the application runs until one of three events occur. If, as shown at step 118, a hook event occurs then step 119 is performed to see if the performance analyzer tool is running. If the performance tool is running, this means that the current module or a previous module has been registered and that this module should collect embedded program hook data. If the performance analyzer tool is running then step 120 is performed. At step 120, the performance analyzer tool is called to log trace information based on the hook contained in the instruction. Hooks may include program entry, program exit, function entry and function exit hooks.

Next, step 122 is performed to determine if a module call or module return event occurred. This determination is made by the operating system service which is called when a new module is being entered. If the module being exited does not contain hooks, then step 126 is performed to see if the performance analyzer tool is running, which means that a the current module or a previous module has been registered with the performance analysis tool and that the current module should collect program exit or entry data. If the performance analyzer tool is running then step 128 is performed to call the performance analyzer tool, sending it a program entry or exit event. If at step 124 it was determined that the module being entered or exited does contain hooks then step 106 is performed for the next module being entered.

At step 130 a check is made to see if a terminate event has occurred. If a terminate event has occurred, then a check is made at step 131 to see if the performance analyzer tool is running. If the performance analyzer tool is running then step 132 is performed. At step 132 the performance analyzer tool is called and sent a module exit event. Next, at step 134, the performance analyzer tool is terminated and the gathered trace information is formatted. Then step 136 is performed and the application is terminated. If the analyzer tool was not running, as determined at step 131, then step 136 is performed to terminate the application.

In an exemplary embodiment, the operating system running the application being analyzed has been modified to check for the presence of hooks in modules upon module entry and exit. If hooks are not found, the operating system passes control to the performance analyzer tool with a request to log either program entry or program exit event data. In an exemplary embodiment, as modules are entered and exited, control of execution is passed from the module being exited to the operating system, then control is passed to the module being entered. As control is passed from the module being exited, operating system services detect whether the module being exited has been compiled with hooks. If not, the operating system service generates a call to the performance analyzer tool to record trace information. If the module being exited is compiled with hooks, the operating system service does nothing because the hook in the object code will initiate recording of trace information. Hooks in the object code will initiate the recording of trace information for each function call in the module. The same process described above is performed for modules being entered. The intelligence in the operating system creates the capability to record the amount of time spent in the system services. This data may be used to decide what objects go into what load modules in order to create more efficient packaging of applications.

Figure 2:
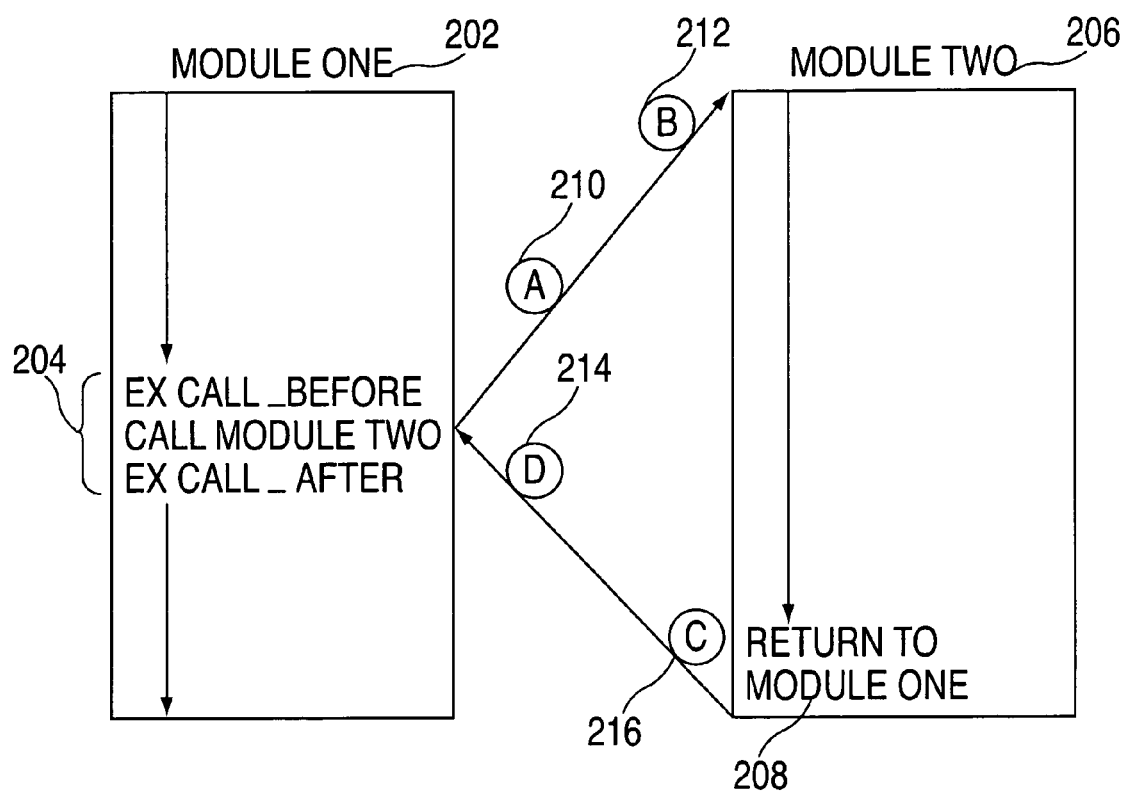
FIG. 2 is diagram showing an exemplary flow of control between two modules in an application using the present invention.

FIG. 2 is diagram showing an exemplary flow of control between two modules in an application using the present invention. The application begins and terminates in module one 202 which is registered with the performance analyzer tool. Module one 202 is compiled with hooks, two hooks are shown for example purposes and more hooks may be contained in module one 202. In addition, the two hooks shown are examples of what a hook could look like, the actual format of the hook will vary based on a specific implementation. Module two 206 does not contain hooks. Points A 210, B 212, C 216, and D 214 are operating system services which execute when exiting and entering the modules 202 206. During execution module one 202 would come to the sample code 204. Code 204 in module one 202 contains a hook "Ex call_before" which calls the performance analyzer to record trace data. Next, the code 204 calls module two 206 "call module two." When this instruction is encountered, the operating system service, at point A 210, looks for hooks in module one 202 to determine if it should initiate recording of trace information by calling the performance analyzer tool. In this example, the module being exited, module one 202, contains hooks so the operating system service does nothing. Next, at point B 212, the operating system service looks in module two 206 to determine if it should initiate the recording of trace information by calling the performance analyzer tool. In this example, module two 206 does not have hooks so the operating system service will initiate the recording of trace information. The operating system service will call the performance analyzer tool to log a program entry event.

Control is then passed to module two 206 which then executes. When the return to module one 202 instruction is encountered ("return to module one" 208) the operating system service is called at point C 216. Point C 216 looks in module two to determine if the recording of trace information is necessary. Because module two 206 does not contain hooks, the operating system service calls the performance analyzer tool to log a program exit event. Similarly, at point D 214 the operating system service looks in module one 202 to determine if the recording of trace data is required. Here, because module one contains hooks, the operating system service will not call the performance analyzer tool. In this example "call module two" 204 and "return to module one" 208 are examples of sample calls to system services which cause a new module to be entered. These calls initiate the operating system services described above.

An advantage of the present invention is that a user can choose the granularity of the trace data by compiling in trace hooks or by leaving the trace hooks out. Fine granularity can be applied to modules of particular interest. The ability to select some modules in an application for fine grain analysis, other modules in the same application for coarse grain analysis, and still other modules in the same application to have no performance analysis, provides a great deal of flexibility in the performance analysis process. It helps to avoid the generation of too much information by allowing a user to specify exactly what level of detail to generate for each module within an application.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore, it is intended that the invention not be limited to the particular embodiments for carrying out this invention, but that the invention will include all embodiments falling within the scope of the appended claims.

What is claimed is:

1. A method for obtaining software performance data, said method comprising:
    entering a software application;
    setting a trace data flag to off;
    while said software application has not exited, iteratively performing the following steps for each module initiated by said software application:
    setting said trace data flag to on if said module is registered with a performance analyzer tool;
    determining if said module includes trace data hooks;
    if said module includes said trace data hooks and said trace data flag is on:
        transmitting a request to said performance analyzer tool to record trace data in response to encountering an embedded trace data hook in said module; and
    if said module does not include said trace data hooks and said trace data flag is on:
        transmitting a request to said performance analyzer tool to record trace data in response to entry and exit of said module; and
    receiving from said performance analyzer tool a report based on said trace data.

2. The method of claim 1 wherein said software application is written in the C programming language.

3. The method of claim 1 wherein said software application is written in the C++ programming language.

4. The method of claim 1 wherein said software application is written in the assembler programming language.

5. The method of claim 1 wherein said trace data in response to entry of said module includes module name and time of module entry.

6. The method of claim 1 wherein said trace data in response to exit of said module includes module name and time of module exit.

7. The method of claim 1 wherein said trace data hooks include:
    program entry; and
    program exit.

8. The method of claim 1 wherein said trace data hooks include;
    function entry; and
    function exit.

9. The method of claim 1 wherein said method for obtaining software performance data further comprises:
    transmitting a request to said performance analyzer tool for said report based on said trace data.

10. The method of claim 1 wherein said report based on said trace data is in graphical format.

11. The method of claim 1 wherein determining if said module includes trace data hooks is performed by an operating system service.

12. The method of claim 1 wherein an operating system service determines if said module is registered with said performance analyzer tool.

13. The method of claim 1 wherein said transmitting a request to said performance analyzer tool to record trace data in response to entry and exit of said module is initiated by an operating system service.

* * * * *